(12) United States Patent
Mok

(10) Patent No.: US 10,475,557 B2
(45) Date of Patent: Nov. 12, 2019

(54) SPIRALING ELECTRIC WIRE BUNDLES FOR LOSS REDUCTION

(71) Applicant: Young Il Mok, Seoul (KR)

(72) Inventor: Young Il Mok, Seoul (KR)

(*) Notice: Subject to any disclaimer, the term of this patent is extended or adjusted under 35 U.S.C. 154(b) by 0 days.

(21) Appl. No.: 15/537,602

(22) PCT Filed: Jan. 20, 2015

(86) PCT No.: PCT/KR2015/000578
§ 371 (c)(1),
(2) Date: Jun. 19, 2017

(87) PCT Pub. No.: WO2016/098941
PCT Pub. Date: Jun. 23, 2016

(65) Prior Publication Data
US 2018/0268966 A1    Sep. 20, 2018

(30) Foreign Application Priority Data

Dec. 18, 2014  (KR) .......................... 10-2014-0183294

(51) Int. Cl.
*H01B 13/00* (2006.01)
*H01B 7/02* (2006.01)
(Continued)

(52) U.S. Cl.
CPC .......... *H01B 13/0036* (2013.01); *H01B 7/02* (2013.01); *H01B 7/30* (2013.01); *H01F 17/062* (2013.01);
(Continued)

(58) Field of Classification Search
None
See application file for complete search history.

(56) References Cited

U.S. PATENT DOCUMENTS 3,249,686 A * 5/1966 Paar .................... G08B 13/122
174/117 M
3,275,966 A * 9/1966 Ashby, Jr. ............ H01F 19/02
174/117 R (Continued)

FOREIGN PATENT DOCUMENTS

JP          2008-235976 A     10/2008
KR    10-2010-0032845 A      3/2010
(Continued)

OTHER PUBLICATIONS

International Search Report dated Jun. 26, 2015 for PCT International Application No. PCT/KR2015/000578.
(Continued)

*Primary Examiner* — Timothy J Thompson
*Assistant Examiner* — Muhammed Azam
(74) *Attorney, Agent, or Firm* — Nixon Peabody LLP; Jeffrey L. Costellia

(57) ABSTRACT

The electric wire bundles includes a first reference axial line and a second reference axial line which are spaced apart from each other and fixed and arranged in parallel with each other, and a first wire and a second wire which are wound in a spiral pattern on the first and second reference axial lines in the first rotating direction or the second rotating direction, wherein the first wire and the second wire intersect at a central axis between the first reference axial line and the second reference axial line.

15 Claims, 14 Drawing Sheets

(51) Int. Cl.
*H01F 27/24* (2006.01)
*H01F 27/28* (2006.01)
*H01F 17/06* (2006.01)
*H01B 7/30* (2006.01)
*H01B 13/02* (2006.01)
*H02S 40/30* (2014.01)
*H01B 9/00* (2006.01)

(52) U.S. Cl.
CPC ......... *H01F 27/24* (2013.01); *H01F 27/2823* (2013.01); *H01B 9/006* (2013.01); *H01B 13/02* (2013.01); *H01F 2017/065* (2013.01); *H01F 2027/2838* (2013.01); *H02S 40/30* (2014.12)

(56) References Cited

U.S. PATENT DOCUMENTS

| | | | | |
|---|---|---|---|---|
| 3,708,608 A | * | 1/1973 | Wyman | F21V 21/002 174/117 F |
| 8,916,773 B2 | | 12/2014 | Mok et al. | |
| 2005/0006130 A1 | * | 1/2005 | Kimijima | H01B 7/00 174/108 |
| 2011/0114361 A1 | * | 5/2011 | Mok | H01B 5/10 174/113 R |
| 2011/0148541 A1 | * | 6/2011 | Sugama | H01B 11/005 333/12 |
| 2016/0172101 A1 | * | 6/2016 | Schmidt | A61N 2/02 600/14 |
| 2018/0268966 A1 | * | 9/2018 | Mok | H01B 7/00 |

FOREIGN PATENT DOCUMENTS

| | | |
|---|---|---|
| KR | 10-2010-0055987 A | 5/2010 |
| KR | 10-2010-0056987 | 5/2010 |
| WO | WO-2010-073315 | 7/2010 |

OTHER PUBLICATIONS

Japanese Office Action (JP Application No. 2017-522422) dated Nov. 26, 2018.

* cited by examiner

SPIRALING ELECTRIC WIRE BUNDLES FOR LOSS REDUCTION

TECHNICAL FIELD

The present invention relates to an electric wire bundle and a method of manufacturing the same.

BACKGROUND ART

Any type of energy is used by consumers after undergoing through four to five processes, that is, generation or collection of energy, transportation of the energy, storage, transformation of the energy into a type easy to use, and usage. There is a loss of energy by a few % to tens of % in every interval between the above processes, and consumers have to accept the loss. As described above, energy is gradually changed into a low quality state (heat of low temperature) due to an entropy law and then is dispersed to an outer space, which causes environmental contamination, as well as loss of energy.

There is a loss in electric energy between generation and transformation of the electric energy and while the electric energy is moved from one spatial point to another spatial point, and it is very important to reduce this loss to reduce costs and protect the environment.

DETAILED DESCRIPTION OF THE INVENTIVE CONCEPT

Technical Problem

One or more embodiments of the present invention relate to electric wire bundles capable of rapidly extracting and moving carriers (electric charges) from a power source and a method of manufacturing the electric wire bundles.

Technical Solution

According to an embodiment of the present invention, there is provided an electric wire bundle including: a first reference axial line and a second reference axial line fixedly arranged in parallel with each other and spaced from each other; a first wire spirally alternatively wound around the first reference axial line and the second reference axial line by revolving around the second reference axial line in a first rotating direction and revolving around the first reference axial line in a second rotating direction opposite the first rotating direction; and a second wire spirally alternatively wound around the first reference axial line and the second reference axial line by revolving around the first reference axial line in the first rotating direction and revolving around the second reference axial line in the second rotating direction, wherein the first wire and the second wire cross each other at a central axis between the first reference axial line and the second reference axial line.

At least one of the first reference axial line, the second reference axial line, the first wire, and the second wire may be a dummy line through which electric current does not flow.

The dummy line may include a conductor, a nonconductor, semiconductor, a flammable material, or a soluble material.

The first reference axial line, the second reference axial line, the first wire, and the second wire may have different widths from one another.

An interval between the first reference axial line and the second reference axial line may be within ten times of a width of the first reference axial line of the second reference axial line.

The electric wire bundle may further include a covering material covering exteriors of the first reference axial line, the second reference axial line, the first wire, and the second wire.

Each of the first reference axial line, the second reference axial line, the first wire, and the second wire may be a solid core wire or a stranded wire.

According to an embodiment of the present invention, there is provided a method of manufacturing an electric wire bundle, the method including: preparing a first reference axial line and a second reference axial line that are fixedly arranged in parallel with each other and spaced from each other; spirally revolving the first wire around the second reference axial line that is farther from the first wire than the first reference axial line in a first rotating direction; spirally revolving the second wire opposite the first wire around the first reference axial line in the first rotating direction while crossing the first wire; spirally revolving the first wire around the first reference axial line in a second rotating direction opposite the first rotating direction; and spirally revolving the second wire around the second reference axial line in the second rotating direction while crossing the first wire.

The first reference axial line, the second reference axial line, the first wire, and the second wire may have different widths from one another.

An interval between the first reference axial line and the second reference axial line may be within ten times of a width of the first reference axial line or the second reference axial line.

At least one of the first reference axial line, the second reference axial line, the first wire, and the second wire may be a dummy line through which electric current does not flow.

The dummy line may include a conductor, a nonconductor, semiconductor, a flammable material, or a soluble material.

When the dummy line includes the flammable material, the flammable material may undergo combustion to remove the dummy line.

When the dummy line includes the soluble material, the soluble material may be dissolved to remove the dummy line.

According to an embodiment of the present invention, there is provided an electric power system including: an electric wire bundle according to one of claim 1 to claim 7; a magnetic member around which the electric wire bundle is wound, or a magnetic member that circularly or cylindrically surrounds the electric wire bundle; an insulating container configured to accommodate the magnetic member and the electric wire bundle; an input terminal electrically connected to an external power; and an output terminal electrically connected to a load.

Advantageous Effects

According to electric wire bundles of the present invention, carriers may be rapidly extracted from a power source and rapidly moved to improve electric power production and transmission efficiency.

BEST MODE

Figure 1:
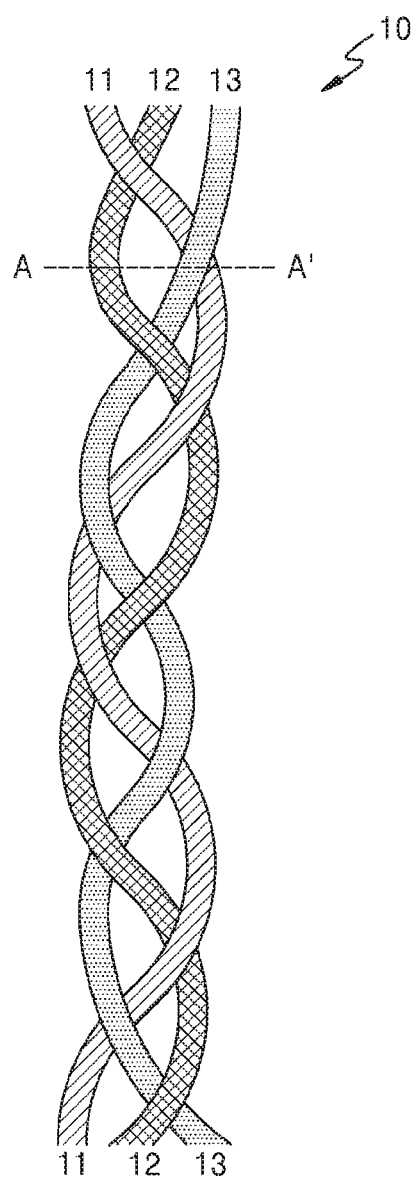
FIG. 1 is a diagram of an electric wire bundle according to an embodiment of the present invention.

An electric wire bundle according to an embodiment of the present invention includes: a first reference axial line and a second reference axial line fixedly arranged in parallel with each other and spaced apart from each other; a first wire spirally alternatively wound around the first reference axial line and the second reference axial line by revolving around the second reference axial line in a first rotating direction and revolving around the first reference axial line in a second rotating direction opposite the first rotating direction; and a second wire alternately spirally wound around the first reference axial line and the second reference axial line by revolving around the first reference axial line in the first rotating direction and revolving around the second reference axial line in the second rotating direction, wherein the first wire and the second wire cross each other at a central axis between the first reference axial line and the second reference axial line.

MODE OF THE INVENTION

Hereinafter, one or more embodiments of the present invention will be described below. Hereinafter, for convenience of description, a strand in which electric current flows is referred to as a wire, and an entire structure formed by twisting wires around one another is referred to as a wire bundle. However, the above definitions are provided for convenience of description, and the scope of the present invention is not limited thereto. Also, thicknesses of lines or sizes of elements shown in the drawings may be exaggerated for convenience of description.

Generation of electricity, that is, power generation and transportation, may be characterized by microscopic variables and macroscopic variables, that is, the result of the microscopic variables. In particular, in solar energy generation, generation and transportation processes of electric power may be described as extrapolation of chemical reaction, and in particular, heterogeneous reactions and flow of electric energy may be dealt with as a part of transport phenomena.

In the solar energy generation, photons incident from the sun collide with a surface of semiconductor to form excitons. Excitons denote that electrons in a conduction band and holes remaining in a filled band bond with each other due to a Coulomb force of attraction to form a pair that becomes neutral quasi-particles in an insulator or semiconductor. When the exciton receives energy corresponding to the Coulomb force of attraction from the outside, the exciton is dissociated (separated) into a free electron and a hole. The above processes may be expressed by the following equations (1) to (3).

$$P+S \rightarrow H+E \tag{1}$$

$$H+E \leftrightarrows X \tag{2}$$

$$H+E \rightarrow N \tag{3}$$

Here, P denotes a photon, S denotes a site on a semiconductor surface, H denotes hole, E denotes a free electron, X denotes an intermediate activated as a pair of a hole and an electron, e.g., the exciton, and N denotes a neutral particle formed by recombining the hole H and the free electron E. As expressed by equation (1), the photon P is projected onto the semiconductor surface S to form the hole H and the free electron E having energy equal to or greater than a width of a forbidden band. As expressed by equation (2), the generated hole H and the free electron E immediately become the exciton X, and the exciton X may be easily separated into the hole H and the free electron E. When concentration of the holes H and the free electrons E increases, the holes H and the free electrons E return to the excitons. That is, the above is a reversible process. As expressed by equation (3), the holes H and the free electrons E bond with each other to form neutral particles N, which is recombination of the electrons and holes, that is, irreversible process.

Under a general reaction condition, since speed of generating the holes H and the free electrons E is very fast, reaction systems of equation (1) and equation (2) are saturated by the holes and the free electrons and recombination such as equation (3) occurs rapidly. Thus, an average lifespan of the holes H and the free electrons E is instance (e.g., tens of nano-seconds).

However, if, in the reaction system, the holes H and/or the free electrons E may be removed before the holes H and the free electrons E return to the excitons X and before the holes H and the free electrons E become the neutral particles N, more holes H and free electrons E may be generated from the excitons X faster. Here, a flow of the free electrons E is the electric current.

The free electrons exiting from the reaction system are moved to a wire through an electrode, and at this time, the free electrons move in much simpler mechanism than that in the reaction system and may be processed as extension in the transport phenomena.

What matters in this case is how to extract the free electrons E from the reaction system fast before the free electrons E are recombined and extinguished and how to move the free electrons E to another space in another environment, that is, a wire.

The exemplary embodiments of the present invention provide a wire bundle capable of generating and transferring the free electrons and the holes in early stage and rapidly moving the free electrons to the wire (wire bundle).

Figure 2A:
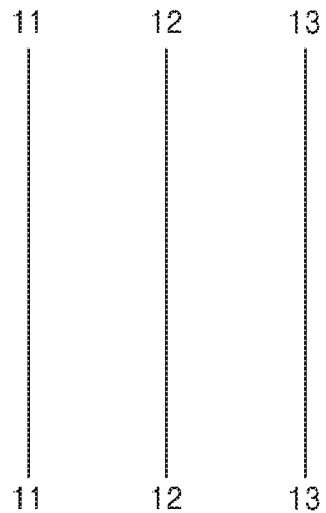
FIGS. 2A to 2D are diagrams illustrating a method of manufacturing the electric wire bundle of FIG. 1.
Figure 2B:
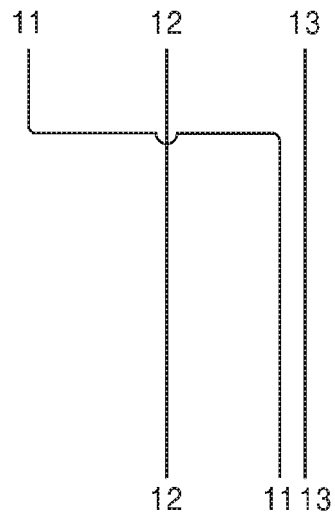
Figure 2C:
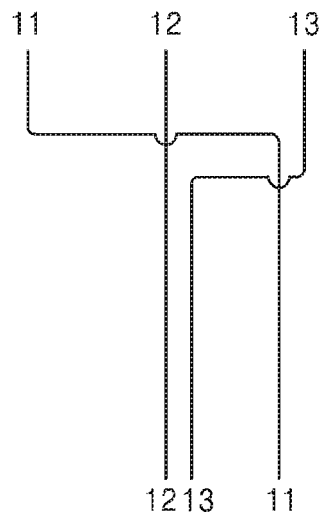
Figure 2D:
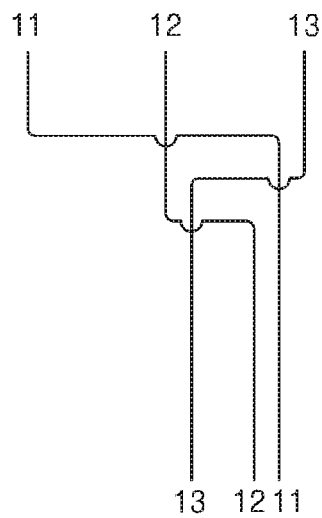
Figure 3:
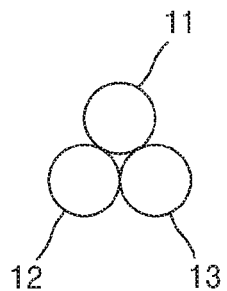
FIG. 3 is a cross-sectional diagram of the electric wire bundles of FIG. 1 taken along a line A-A'.

FIG. 1 is a diagram of an electric wire bundle according to an embodiment of the present invention, FIGS. 2A to 2D are diagrams illustrating a method of manufacturing the electric wire bundle of FIG. 1, and FIG. 3 is a cross-sectional diagram of the electric wire bundle of FIG. 1 taken along a line A-A'.

The wire bundle 10 according to the embodiment illustrated in FIG. 1 is formed by twisting three wires 11, 12, and 13 around one another. Each of the wires may be coated with an insulator. The wires may include a metal such as copper, silver, gold, aluminum, etc., or an alloy thereof, and may have the same or different thicknesses. At least one of the three wires may be a (+) wire and the other may be (−) wires.

The three wires 11, 12, and 13 of the wire bundle 10 spirally rotates about a neighboring wire in a clockwise direction or a counter-clockwise direction and are twisted around the neighboring wires.

The above three wires may be twisted as follows.

Referring to FIG. 2A, the three wires 11, 12, and 13 are arranged in parallel with one another.

As shown in FIG. 2B, the first wire 11 located at the leftmost portion is moved over the second wire 12 to be located between the second wire 12 and the third wire 13.

Next, as shown in FIG. 2C, the third wire 13 located opposite the first wire 11, that is, the rightmost portion, is moved over the first wire 11 to be located between the second wire 12 and the first wire 11.

Next, as shown in FIG. 2D, the second wire 12 located at the leftmost portion is moved over the third wire 13 to be located between the first wire 11 and the third wire 13.

That is, an operation of locating one wire at an end portion to be between other two wires is repeated in the above process.

When the wires are twisted in the above described manner, the third wire 13, the second wire 12, and the first wire 11 are sequentially arranged from the left side. That is, the wires are arranged in an order opposite the original order.

When the processes shown in FIGS. 2B to 2D are repeated again, the first wire 11, the second wire 12, and the third wire 13 are sequentially arranged, that is, in the same order as the original order. By twisting the wires through the operations illustrated in FIGS. 2B to 2D, the plurality of wires cross each other to form a regular twist as shown in FIG. 1. In addition, the arrangement of the wires is periodically repeated due to the regular twist.

The electric wire bundle 10 shown in FIG. 1 may maintain its shape independently without any external structure since each of the wires 11, 12, and 13 pulls the other wires.

Although as shown in FIG. 1 for convenience of description the wires 11, 12, and 13 have intervals therebetween, the wires 11, 12, and 13 may be twisted around one another while being in contact with one another as shown in FIG. 3.

Figure 4:
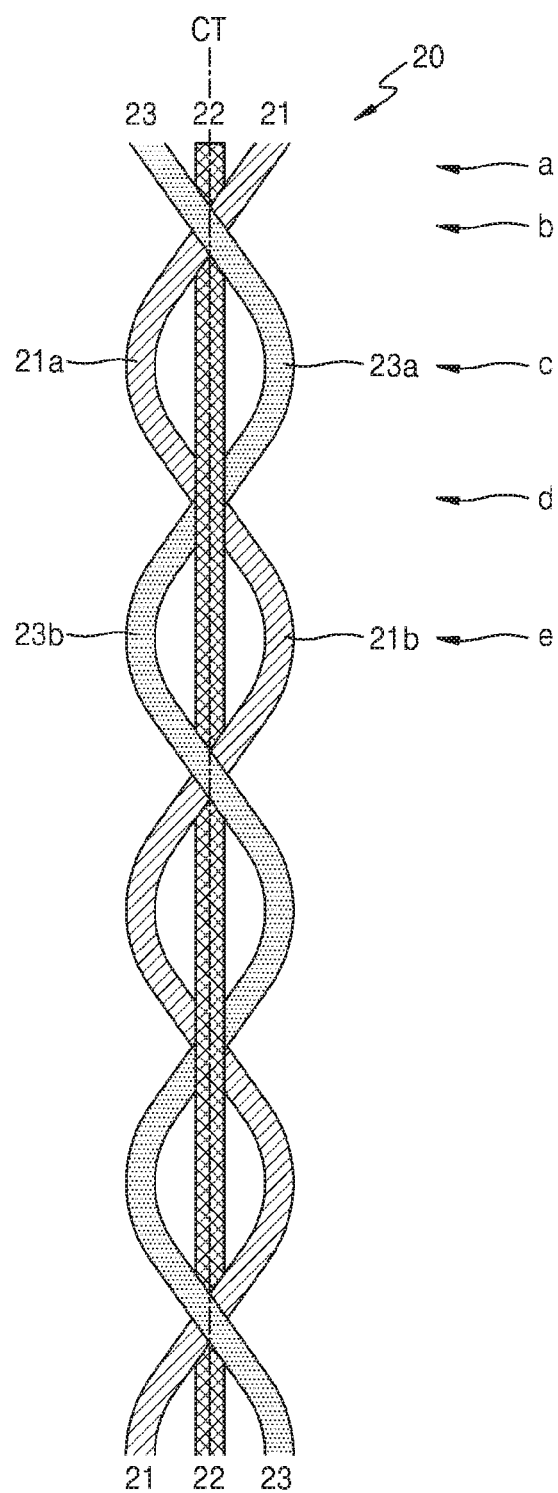
FIG. 4 is a diagram of an electric wire bundle according to another embodiment of the present invention.
Figure 5A:
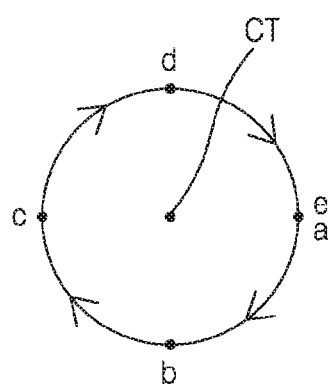
FIGS. 5A and 5B are diagrams showing rotating direction of wires included in the electric wire bundle of FIG. 4.
Figure 5B:
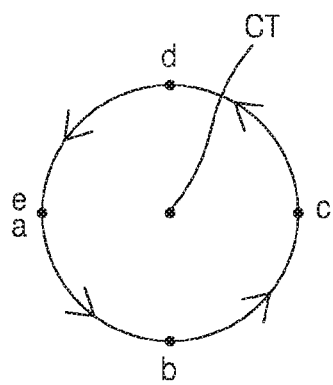
Figure 6A:
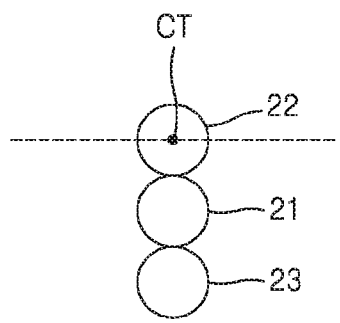
FIGS. 6A and 6B are partially cross-sectional views of the electric wire bundle of FIG. 4.
Figure 6B:
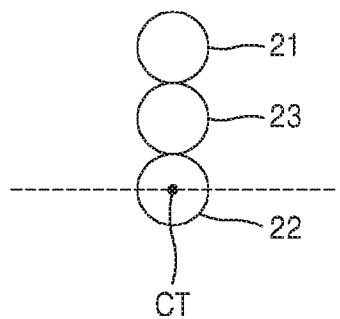

FIG. 4 is a diagram of an electric wire bundle according to another embodiment, FIGS. 5A and 5B are diagrams showing a rotating direction of a wire included in the electric wire bundle of FIG. 4, and FIGS. 6A and 6B are partially cross-sectional view of the electric wire bundle of FIG. 3.

The electric wire bundle 20 according to the embodiment of FIG. 4 may include three wires 21, 22, and 23, some of which, for example, one (22) of the three wires 21, 22, and 23, may be a wire that becomes an axis (hereinafter, referred to as 'a reference axial line'). The electric wire bundle 20 includes a reference axial line located at a center 22, and the first wire 21 and the second wire 23 that are respectively arranged at right and left sides of the reference axial line 22. Each of the wires may be coated with an insulator. The wires may include a metal such as copper, silver, gold, aluminum, etc., or an alloy thereof, and may have the same or different thicknesses. At least one of the three wires may be a (+) wire, and the other may be (−) wires.

The reference axial line 22 is fixed at a central axis CT, and the first wire 21 and the second wire 23 alternatively spirally revolve around the reference axial line 22 and cross each other. Accordingly, the first and second wires 21 and 23 are physically coupled to the reference axial line 22.

The first wire 21 spirally revolves around the reference axial line 22 in a clockwise direction. The second wire 23 spirally revolves around the reference axial line 22 in a counter-clockwise direction. Hereinafter, it will be described under an assumption that the electric wire bundle 20 is seen from a front portion of the page, for convenience of description.

Referring to FIG. 5A, the first wire 21 is wound around the reference axial line 22 while revolving spirally in a clockwise direction. That is, the first wire 21 spirally revolves from a location (a) to a location (b) and a location (c) of the wire bundle 20, that is, from the right to the left in front of the reference axial line 22 to be located on a front portion of the reference axial line 22 (21a), and then, spirally revolves from the location (c) to a location (d) and a location (e), that is, from the left to the right behind the reference axial line 22 to be located at a rear portion of the reference axial line 22 (21b). Then, the above revolving pattern is repeatedly performed.

Referring to FIG. 5B, the second wire 22 is wound around the reference axial line 22 while revolving spirally in a counter-clockwise direction. That is, the second wire 23 spirally revolves from a location (a) to a location (b) and a location (c) of the wire bundle 20, that is, from the left to the right in front of the reference axial line 22 to be located on a front portion of the reference axial line 22 (23a), and then, spirally revolves from the location (c) to a location (d) and a location (e), that is, from the right to the left behind the reference axial line 22 to be located at a rear portion of the reference axial line 22 (23b). Then, the above revolving pattern is repeatedly performed.

FIG. 6A is a cross-sectional view of the electric wire bundle 20 at the location (b), and denotes relative positions of the first wire 21, the reference axial line 22, and the second wire 23. As shown in FIG. 6A, when the first wire 21 and the second wire 23 are located in front of the reference axial line (21a and 23a), the first wire 21 is located between the reference axial line 22 and the second wire 23 and crosses the second wire 23.

FIG. 6B is a cross-sectional view of the electric wire bundle 20 at the location (d), and denotes relative positions of the first wire 21, the reference axial line 22, and the second wire 23. As shown in FIG. 6B, when the first wire 21 and the second wire 23 are located behind the reference axial line 22 (21b and 23b), the second wire 23 is located between the reference axial line 22 and the first wire 21 and crosses the first wire 21.

The reference axial line 22 or the first and second wires 21 and 23 may include a dummy line. The dummy line is a wire though which the electric current does not flow, and may include a conductor, a nonconductor, semiconductor, or a flammable material. Also, the dummy line may include a soluble material. When the dummy line includes the flammable material, the flammable material is under combustion to remove the dummy line. When the dummy line includes the soluble material, the soluble material may be dissolved to remove the dummy line.

FIG. 4 shows that the wires 21, 22, and 23 maintain intervals therebetween for convenience of description, but the wires 21, 22, and 23 may contact one another when crossing one another.

Figure 7:
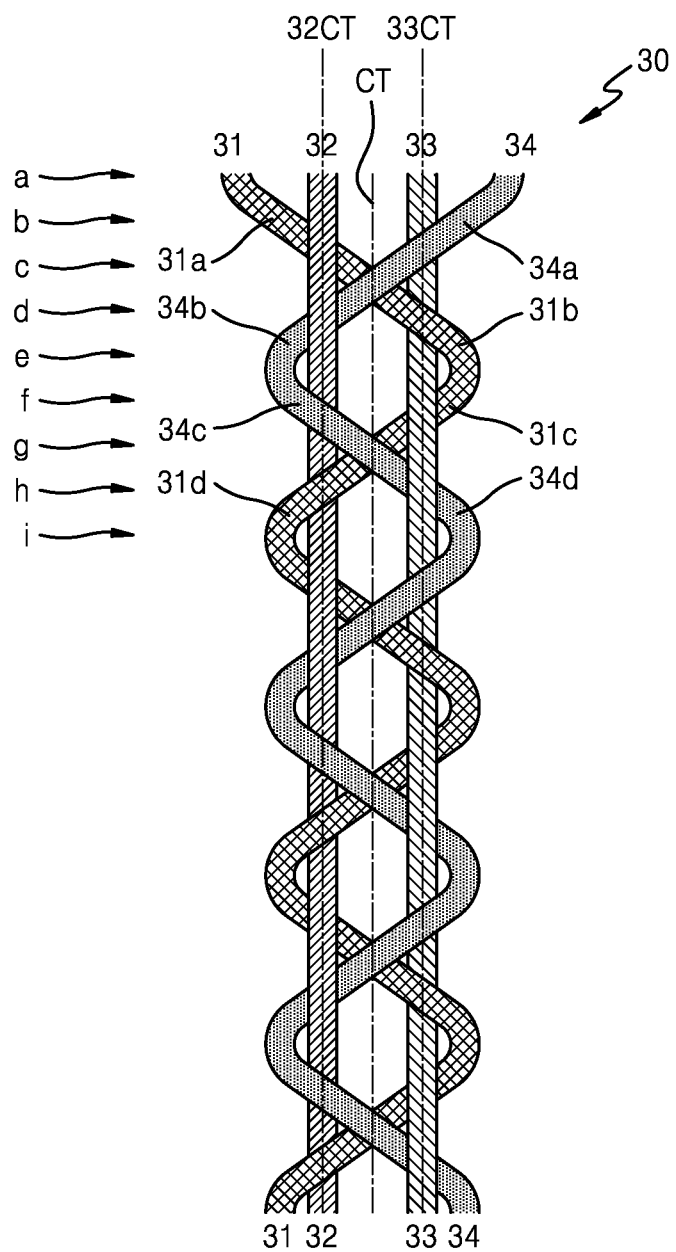
FIG. 7 is a diagram of an electric wire bundle according to another embodiment of the present invention.
Figure 8A:
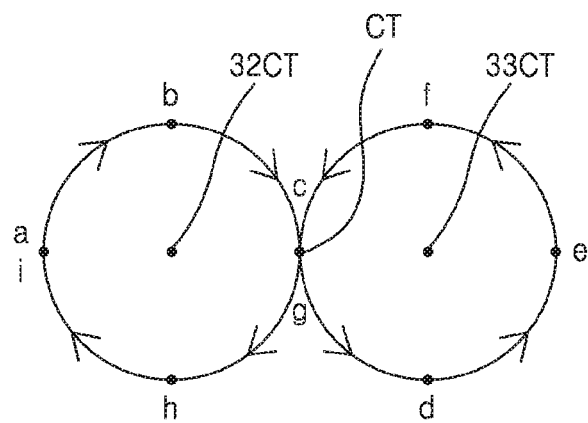
FIGS. 8A and 8B are diagrams showing rotating directions of wires in the electric wire bundles of FIG. 7.
Figure 8B:
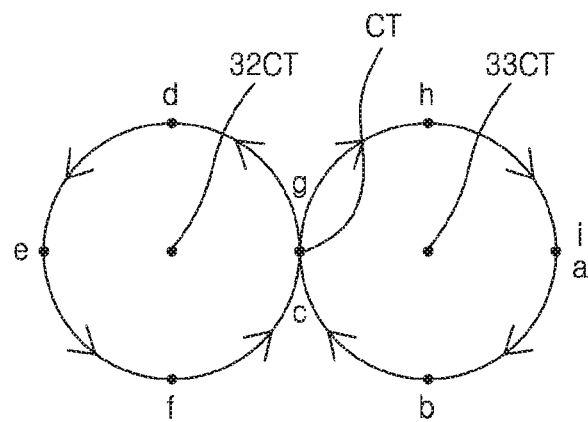

FIG. 7 is a diagram of an electric wire bundle according to another embodiment, FIGS. 8A and 8B are diagrams showing a rotating direction of a wire included in the electric wire bundle of FIG. 7, and FIGS. 9A to 9D are diagrams illustrating a method of manufacturing the electric wire bundle of FIG. 7.

The electric wire bundle 30 according to the embodiment of FIG. 7 is formed by twisting four wires 31, 32, 33, and 34 around one another. Each of the wires may be coated with an insulator. The wires may include metal such as copper, silver, gold, aluminum, etc., or an alloy thereof, and may have thicknesses that are the same as or different from one another.

Some of the four wires 31, 32, 33, and 34, for example, two wires 32 and 33, may be reference axial lines. The reference axial lines 32 and 33 are arranged with a predetermined interval therebetween. A distance between the reference axial lines 32 and 33 may be within ten times of a width of the wire of the reference axial line. For example, the distance between the first reference axial line 32 and the second reference axial line 33 may be within ten times of a width of the first reference axial line 32 or the second reference axial line 33. At least one of the four wires 31, 32, 33, and 34 is (+) line and the other wires may be (−) wires.

The first reference axial line 32 and the second reference axial line 33 are arranged in parallel with each other, and the first reference axial line 32 is located at left of the second reference axial line 33. The first reference axial line 32 and the second reference axial line 33 are respectively fixed on a central axis 32CT and a central axis 33CT, and first and second wires 31 and 34 alternatively and spirally revolve around the first reference axial line 32 and the second reference axial line 33. The first and second wires 31 and 34 cross each other between the first and second reference axial lines 32 and 33. The first and second wires 31 and 34 may cross each other at a central axis CT. Accordingly, the first and second wires 31 and 34 and the first and second reference axial lines 32 and 33 are physically coupled to each other. The central axis 33CT correspond to a center between the first reference axial line 32 and the second reference axial line 33.

Hereinafter, for convenience of description, it will be described under an assumption that the electric wire bundle 30 is seen from a front portion of the page.

FIG. 8A is a diagram showing a rotating pattern of the first wire 31, and FIG. 8B is a diagram showing a rotating pattern of the second wire 34.

Referring to FIG. 8A, the first wire 31 spirally revolves around the first reference axial line 32 in a clockwise direction, and spirally revolves around the second reference axial line 33 in a counter-clockwise direction. That is, the first wire 31 spirally revolves from a location (a) to a location (b), and a location (c), that is, from the left to the central axis CT behind the first reference axial line 32 and then is located on a rear portion of the first reference axial line 32 (31a), and then, the first wire 31 spirally revolves from the location (c) to a location (d) and a location (e), that is, from the central axis CT to the right in front of the second reference axial line 33 and is located at a front portion of the second reference axial line 33 (31b). In addition, the first wire 31 spirally revolves from the location (e) to a location (f) and a location (g), that is, from the right to the central axis CT behind the second reference axial line 33 and is located at a rear portion of the second reference axial line 33 (31c), and spirally revolves from the location (g) to a location (h) and a location (i), that is, from the central axis CT to the left in front of the second reference axial line 32 and is located at a front portion of the first reference axial line 32 (31d).

Referring to FIG. 8B, the second wire 34 spirally revolves around the first reference axial line 32 in a counter-clockwise direction, and spirally revolves around the second reference axial line 33 in a clockwise direction. That is, the second wire 34 spirally revolves from the location (a) of the electric wire bundle 30 from the location (b) and the location (c), that is, from the right to the central axis CT in front of the second reference axial line 33 and is located at a front portion of the second reference axial line 33 (34a), and then, spirally revolves from the location (c) to the location (d) and the location (e), that is, from the central axis CT to the left behind the first reference axial line 32 and is located at a rear portion of the first reference axial line 32 (34b). In addition, the second wire 34 spirally revolves from the location (e) of the electric wire bundle 30 to a location (f) and a location (g), that is, from the left to the central axis CT in front of the first reference axial line 32 and is located at a front portion of the first reference axial line 32 (34c), and spirally revolves from the location (g) to a location (h) and a location (i), that is, from the central axis CT to the right behind the second reference axial line 33 and is located at a front portion of the second reference axial line 33 (34d).

The above four wires may be twisted as follows.

First, the first reference axial line 32 and the second reference axial line 33 are fixedly arranged in parallel with each other to be separate from each other based on the central axis CT.

Figure 9A:
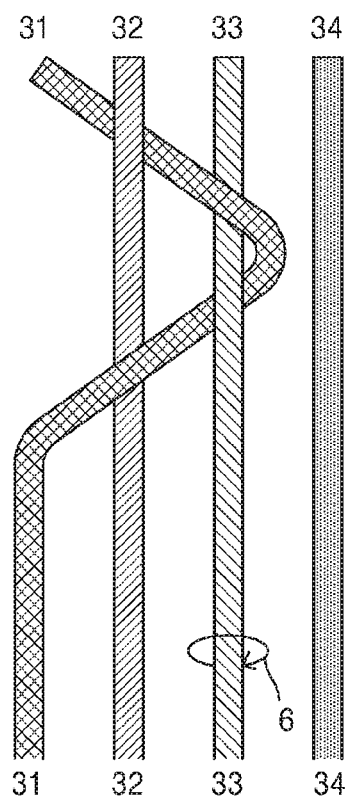
FIGS. 9A to 9D are diagrams illustrating a method of manufacturing the electric wire bundle of FIG. 7.

As shown in FIG. 9A, the first wire 31 located at a leftmost portion spirally revolves around the second reference axial line 33 in a counter-clockwise direction 6 and then proceeds to the left portion while passing in front of the first reference axial line 32.

Figure 9B:
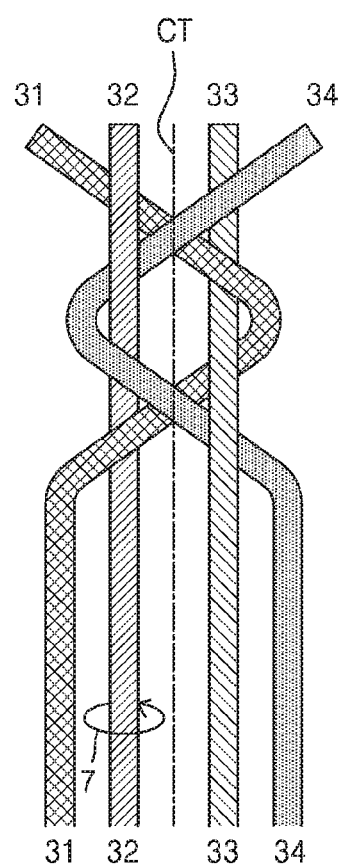

In addition, as shown in FIG. 9B, the second wire 34 opposite the first wire 31, that is, located at a rightmost portion, crosses the first wire 31 and then spirally revolves around the first reference axial line 32 that is farther from the second wire 34 in the counter-clockwise direction 7. The second wire 34 spirally revolves around the first reference axial line 32, crosses the first wire 31 again, and proceeds to the right while passing behind the second reference axial line 33.

Figure 9C:
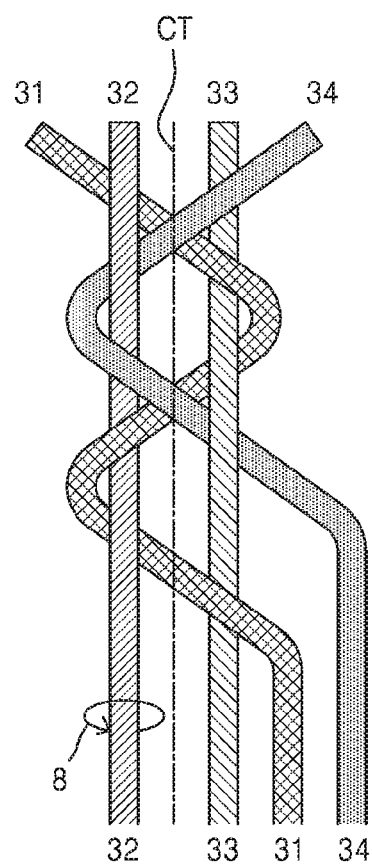

Next, as shown in FIG. 9C, the first wire 31 spirally revolves around the first reference axial line 32 in a clockwise direction 8, and then, proceeds to the right side while passing in front of the second reference axial line 33.

Figure 9D:
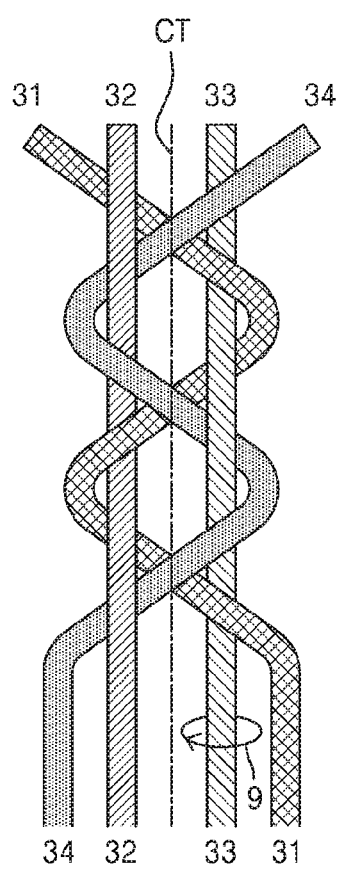

In addition, as shown in FIG. 9D, the second wire 34 spirally revolves around the second reference axial line 33 in a clockwise direction 9. The second wire 34 spirally revolves around the second reference axial line 33, crosses the first wire 31, and proceeds to the left side while passing through behind the first reference axial line 32.

Through the processes illustrated in FIGS. 9A to 9D, the first wire 31 and the second wire 34 alternatively and repeatedly revolve in a spiral around the first reference axial line 32 and the second reference axial line 33 fixed at the central axis 32CT and the central axis 33CT to form twist. Accordingly, as shown in FIG. 7, the plurality of wires cross one another to have regularly twisted shape. In addition, the arrangement of the wires is periodically repeated due to the regular twist. The twisted pattern in the spiral pattern may have various shapes, e.g., an oval shape, a triangular shape, etc.

Although not shown in the drawings, when the electric wire bundle is seen from the rear portion, the first reference axial line 32 is located at the right of the second reference axial line 33, opposite to the example of FIG. 7. Accordingly, the first wire 31 spirally revolves around the first reference axial line 32 from the left to the right to be wound around the first reference axial line 32 in an order of the front, outer side, and the rear portion of the first reference axial line 32, and spirally revolves around the second reference axial line 33 from the right to the left to be wound around the second reference axial line 32 in an order of the front, the outer side, and the rear portion of the second reference axial line 33. The second wire 34 spirally revolves around the first reference axial line 32 from the left to the right to be wound around the first reference axial line 32 in an order of the rear portion, the outer side, and the front of the first reference axial line 32, and spirally revolves around the second reference axial line 33 from the right to the left to be wound around the second reference axial line 32 in an order of the rear portion, the outer side, and the front of the second reference axial line 33.

In the previous embodiment, the first wire 31 revolves first and the second wire 34 revolves next, and the above processes are repeatedly performed. However, the present invention is not limited to the above embodiment, and processes of revolving the second wire 34 first and revolving the first wire 31 may be repeatedly performed.

In the electric wire bundle 30 of FIG. 7, each of the wires 31, 32, 33, and 34 pulls the other wires so that the electric wire bundle 30 may maintain the shape of itself independently without an external supporting structure.

In FIG. 7, intervals among the wires 31, 32, 33, and 34 are maintained for convenience of description, but the wires 31, 32, 33, and 34 may cross one another while contacting one another.

The first and second reference axial lines 32 and 33 or the first and second wires 31 and 34 may include a dummy line. The dummy line is a wire in which the electric current does not flow, and may include a conductor, a nonconductor, semiconductor, or a flammable material. Also, the dummy line may include a soluble material. When the dummy line includes the flammable material, the flammable material is combusted to remove the dummy line. When the dummy line includes the soluble material, the soluble material may be dissolved to remove the dummy line.

Figure 10:
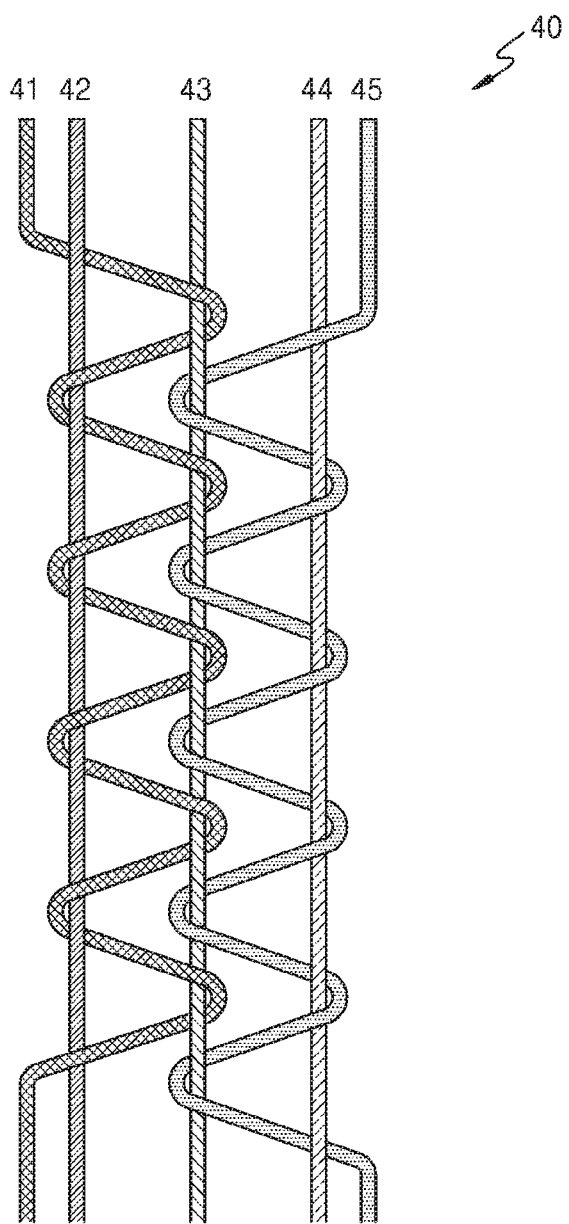
FIG. 10 is a diagram of an electric wire bundle according to another embodiment of the present invention.

FIG. 10 is a diagram of electric wire bundles according to another embodiment of the present invention.

The electric wire bundle 40 illustrated in FIG. 10 may be formed by twisting five wires 41, 42, 43, 44, and 45 around one another. Each of the wires may be coated with an insulator. The wires may include metal such as copper, silver, gold, aluminum, etc., or an alloy thereof, and may have thicknesses that are the same as or different from one another.

Some of the five wires 41, 42, 43, 44, and 45, e.g., three wires 42, 43, and 44 may be reference axial lines. The reference axial lines 42, 43, and 44 are arranged in a row with predetermined intervals therebetween. However, the present invention is not limited to the above example, and the reference axial lines 42, 43, and 44 may be arranged three-dimensionally. For example, a cross-section of the arrangement of the reference axial lines 42, 43, and 44 may have a polygonal shape, e.g., a triangular shape, a circular shape, an oval, a polygon, an infinity symbol shape (∞), a peanut shape, etc. A distance among the reference axial lines 42, 43, and 44 may be within ten times of a width of the wire of the reference axial line. For example, the distance between the first reference axial line 42 and the second reference axial line 43 may be within ten times of a width of the first reference axial line 42 or the second reference axial line 43 or less. The distance between the second reference axial line 43 and the third reference axial line 44 may be within ten times of a width of the second reference axial line 43 or the third reference axial line 44. At least one of the five wires 41, 42, 43, 44, and 45 is (+) line and the other wires may be (−) wires.

Each of the reference axial lines 42, 43, and 44 is fixed at a central axis thereof, and two wires, that is, a first wire 41 and a second wire 45 may be arranged to be twisted regularly and three-dimensionally around the reference axial lines 42 to 44. The first wire 41 may spirally revolves around two reference axial lines 42 and 43 from among the three reference axial lines 42 to 44. The second wire 45 may spirally revolves around two reference axial lines 43 and 44 from among the three reference axial lines 42 to 44.

The first wire 41 passes behind the first reference axial line 42 that is closest to the first wire 41 and spirally revolves around the second reference axial line 43 at the center from the front to the back in the counter-clockwise direction, and then, spirally revolves around the first reference axial line 42 from the front to the back in the clockwise direction.

The second wire 45 passes in front of the third reference axial line 44 that is closest to the second wire 45 and spirally revolves around the second reference axial line 43 at the center from the back to the front in the counter-clockwise direction, and then, spirally revolves around the third reference axial line 44 from the back to the front in the clockwise direction.

The first wire 41 and the second wire 45 spirally revolve around the second reference axial line 44 in common, and do not cross each other.

In the present embodiment, two wires 41 and 45 are twisted so as not to cross each other. However, the present invention is not limited thereto, and the wires 41 and 45 may twisted around the reference axial lines 42 to 44 while crossing each other.

The reference axial lines 42 to 44 or the first and second wires 41 and 45 may include a dummy line. The dummy line is, as described above, a wire in which the electric current does not flow, and may include a conductor, a nonconductor, semiconductor, a flammable material, or a soluble material. When the dummy line includes the flammable material, the flammable material is combusted to remove the dummy line. When the dummy line includes the soluble material, the soluble material may be dissolved to remove the dummy line.

Terminals at opposite ends of the electric wire bundles 10 to 40 according to the previous embodiments may each include two terminals, that is, a (+) terminal and a (−) terminal. The terminals may include a bundle of the reference axial line and wires twisted around the reference axial line, and each of the terminals may be determined to have various combinations so as to include some of the entire wires included in the electric wire bundle. For example, each terminal may include half the entire wires included in the electric wire bundle. If there are two reference axial lines and two additional wires winding around the reference axial lines, the (+) terminal may include one reference axial line and one wire and the (−) terminal may include one another reference axial line and the remaining wire. If there are three reference axial lines and two additional wires, each of the (+) terminal and the (−) terminal may include one reference axial line and one additional wire and one remaining reference axial line may include a dummy line.

According to the electric wire bundles 10 to 40 of the previous embodiments, a covering material including plastic or rubber may be wound around the electric wire bundle to maintain the shape of the electric wire bundle and to prevent interference between the electric wire bundle and an exterior of the electric wire bundle.

Each of the reference axial line and wires included in the electric wire bundles 10 to 40 according to the previous embodiments may be a solid core wire or a stranded wire.

Table 1 below shows experimental data obtained by measuring effects of the electric wire bundle according to an embodiment of the present invention.

TABLE 1

| | Comparative example (4 mm² covered PV cable) | | | Electric wire bundle according to an embodiment (0.75 mm enamel covered copper wire, four lines (including two reference axial lines)) | | |
|---|---|---|---|---|---|---|
| Insolation (W/m²) | Current (A) | Voltage (V) | Power (W) | Current (A) | Voltage (V) | Power (W) |
| 880 | 3.29 | 4.98 | 16.39 | 3.54 | 7.47 | 26.44 |

The measurement of above data was performed by using a multi-crystalline solar panels 250 W of Sinsung Solar Energy, Inc., and an IV tester (Model MP170) of EKO, Inc.

Under the same conditions (insolation and temperature of 28° C.), power generation amounts of the multi-crystalline solar panels 250 W were compared by using a wire according to a comparative example and the electric wire bundle (the electric wire bundle of FIG. 7) according to the embodiment of the present invention. When the electric wire bundle according to the embodiment was used, an electric current (A) increased by about 8%, a voltage (V) increased by about 50%, and a power generation amount increased by about 61% when compared with a cable according to the comparative example.

As illustrated in Table 1 above, when the electric wire bundle according to the embodiment of the present invention, the power generation may increase more than that of the cable according to the prior art.

The electric wire bundle including one or more reference axial lines and one or more additional wires twisted around and contacting the reference axial line according to the embodiments of the present invention may allow the electric current to flow faster, and may be involved in or interfere with electro-kinetic operations occurring in the electric power connected to the electric wire bundle according to the embodiments so as to make the wires carry more free electrons.

Theoretical backgrounds of improving transport efficiency by using the electric wire bundle according to the previous embodiments may be found in concepts such as electro-kinetics initially named by the present Applicant and derived from the combination of theories and methodologies of chemical kinetics and electrical science, Maxwell's equations, existence of maximum allowable amount or saturation capacity of a transport line due to an electricity generation source, electromagnetic interactions among wires where the electric current flows, etc.

The electric wire bundle according to the embodiments of the present invention may be applied to photovoltaic power generation, microbial power generation, fuel cell generation, etc. In particular, the electric wire bundle including the plurality of wires according to the embodiments of the present invention may exhibit noticeable effects in a field of photovoltaic power generation.

For example, in a case where the electric power generated by the photovoltaic power generation is transferred to a storage battery via the electric wire bundle according to the embodiments of the present invention, electric power generated at a solar battery side may be effectively transferred to the storage battery.

The concept of the photovoltaic power generation includes irradiating sunlight onto a p-n junction material to generate carriers and moving the carriers. Here, when the number of carriers increases in the p-n junction material due to the irradiation of the sunlight, an efficiency of generating additional carriers degrades. Therefore, the generated carriers have to be transported fast to the external portion to be removed. However, in the carriers, velocity of the free electrons, e.g., drift velocity, is very low unlike common ideas (e.g., it takes one hour and ten minutes for the free electrons to move 1 m).

Therefore, when the electric wire bundle according to the embodiment of the present invention is used, the acceleration of the electron mobility may be expected according to the above-described theories, and accordingly, the newly generated carriers in the p-n junction material may be rapidly removed to improve the power generation efficiency.

In addition, the electric wire bundle according to the embodiment of the present invention may be used as an electric power system, that is, the electric wire bundle according to the present invention may be wound a few to tens of times around a magnetic core, e.g., a magnetic member including a magnetic material having a high magnetic permeability such as ferrite, permalloy, a silicon steel plate, etc., or may be covered by a magnetic member including a magnetic material of the ring type or the cylindrical type. The electric power system may include an insulating container, in which the electric wire bundle and the magnetic member may be accommodated in one space, and an input side may include an input terminal capable of being connected to a power source side and an output side may include output terminals capable of being connected to a load side.

Although a few embodiments of the present invention have been shown and described, it would be appreciated by those skilled in the art that changes may be made to these embodiments without departing from the principles and spirit of the invention, the scope of which is defined in the claims and their equivalents.

The invention claimed is:

1. An electric wire bundle comprising:
   a first reference axial line and a second reference axial line fixedly arranged in parallel with each other and spaced from each other;
   a first wire spirally alternatively wound around the first reference axial line and the second reference axial line by revolving around the second reference axial line in a first rotating direction and revolving around the first reference axial line in a second rotating direction opposite the first rotating direction; and
   a second wire spirally alternatively wound around the first reference axial line and the second reference axial line by revolving around the first reference axial line in the first rotating direction and revolving around the second reference axial line in the second rotating direction,
   wherein the first wire and the second wire cross each other at a central axis between the first reference axial line and the second reference axial line, and
   wherein positions of the second wire to the first wire are the same at the central axis and that a same cross patterns of the first wire and the second wire are repeated.

2. The electric wire bundle of claim 1, wherein at least one of the first reference axial line, the second reference axial line, the first wire, and the second wire is a dummy line through which electric current does not flow.

3. The electric wire bundle of claim 2, wherein the dummy line includes a conductor, a nonconductor, semiconductor, a flammable material, or a soluble material.

4. The electric wire bundle of claim 1, wherein the first reference axial line, the second reference axial line, the first wire, and the second wire have different widths from one another.

5. The electric wire bundle of claim 1, wherein an interval between the first reference axial line and the second reference axial line is within ten times of a width of the first reference axial line or the second reference axial line.

6. The electric wire bundle of claim 1, further comprising a covering material covering exteriors of the first reference axial line, the second reference axial line, the first wire, and the second wire.

7. The electric wire bundle of claim 1, wherein each of the first reference axial line, the second reference axial line, the first wire, and the second wire is a solid core wire or a stranded wire.

8. A method of manufacturing an electric wire bundle, the method comprising:
preparing a first reference axial line and a second reference axial line that are fixedly arranged in parallel with each other and spaced from each other;
spirally revolving a first wire around the second reference axial line that is farther from the first wire than the first reference axial line in a first rotating direction;
spirally revolving a second wire opposite the first wire around the first reference axial line in the first rotating direction while crossing the first wire;
spirally revolving the first wire around the first reference axial line in a second rotating direction opposite the first rotating direction; and
spirally revolving the second wire around the second reference axial line in the second rotating direction while crossing the first wire,
wherein positions of the second wire to the first wire are the same at a central axis that a same cross patterns of the first wire and the second wire are repeated.

9. The method of claim 8, wherein the first reference axial line, the second reference axial line, the first wire, and the second wire have different widths from one another.

10. The method of claim 8, wherein an interval between the first reference axial line and the second reference axial line is within ten times of a width of the first reference axial line or the second reference axial line.

11. The method of claim 8, wherein at least one of the first reference axial line, the second reference axial line, the first wire, and the second wire is a dummy line through which electric current does not flow.

12. The method of claim 11, wherein the dummy line includes a conductor, a nonconductor, semiconductor, a flammable material, or a soluble material.

13. The method of claim 12, wherein, when the dummy line includes the flammable material, the flammable material undergoes combustion to remove the dummy line.

14. The method of claim 12, wherein, when the dummy line includes the soluble material, the soluble material is dissolved to remove the dummy line.

15. An electric power system comprising: the electric wire bundle according to claim 1; a magnetic member around which the electric wire bundle is wound, or a magnetic member that a second magnetic member that circularly or cylindrically surrounds the electric wire bundle; an insulating container configured to accommodate the magnetic member and the electric wire bundle; an input terminal electrically connected to an external power; and an output terminal electrically connected to a load.

* * * * *